(12) United States Patent
Kobayakawa

(10) Patent No.: US 7,409,227 B2
(45) Date of Patent: Aug. 5, 2008

(54) RADIO APPARATUS

(75) Inventor: Shuji Kobayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 11/059,953

(22) Filed: Feb. 17, 2005

(65) Prior Publication Data

US 2005/0159121 A1 Jul. 21, 2005

Related U.S. Application Data

(63) Continuation of application No. PCT/JP03/02844, filed on Mar. 11, 2003.

(51) Int. Cl.
*H04M 1/00* (2006.01)
*G01S 5/02* (2006.01)
*H04B 1/00* (2006.01)

(52) U.S. Cl. ............... 455/562.1; 455/561; 342/417; 342/445

(58) Field of Classification Search ............ 455/562.1, 455/561, 63.1, 63.4, 65, 107, 121, 193.1, 455/114.2, 278.1, 67.13, 135; 342/442, 437, 342/417, 434, 445, 380, 382, 385
See application file for complete search history.

(56) References Cited

U.S. PATENT DOCUMENTS

| | | | | |
|---|---|---|---|---|
| 5,841,400 A | * | 11/1998 | Hiramatsu | ............ 342/382 |
| 5,854,612 A | * | 12/1998 | Kamiya et al. | ............ 342/383 |
| 5,966,095 A | * | 10/1999 | Hiramatsu et al. | ............ 342/383 |
| 5,999,800 A | * | 12/1999 | Choi et al. | ............ 455/73 |
| 6,351,238 B1 | * | 2/2002 | Kishigami et al. | ............ 342/445 |
| 6,366,241 B2 | * | 4/2002 | Pack et al. | ............ 342/442 |
| 6,446,025 B1 | * | 9/2002 | Nakamura et al. | ............ 702/159 |
| 6,529,745 B1 | * | 3/2003 | Fukagawa et al. | ............ 455/562.1 |
| 6,781,543 B2 | * | 8/2004 | Nakagawa et al. | ............ 342/367 |
| 6,897,807 B2 | * | 5/2005 | Kishigami et al. | ............ 342/417 |

FOREIGN PATENT DOCUMENTS

| | | |
|---|---|---|
| JP | 6-273504 | 9/1994 |
| JP | 8-114662 | 5/1996 |
| JP | 10-170621 | 6/1998 |
| JP | 10-177064 | 6/1998 |
| JP | 10-229307 | 8/1998 |
| JP | 2001-281316 | 10/2001 |
| JP | 2002-107439 | 4/2002 |

OTHER PUBLICATIONS

International Search Report dated Jun. 24, 2003.

\* cited by examiner

*Primary Examiner*—Sonny Trinh
(74) *Attorney, Agent, or Firm*—Katten Muchin Rosenman LLP

(57) ABSTRACT

The invention relates to a radio apparatus for estimating a direction from which a received wave arrives and forming a radio transmission channel between a transmitting end of the received wave and itself. The invention aims to maintain stable transmission quality. The radio apparatus of the invention includes: two receiving sections which alternately detect two received waves that have arrived from a same transmitting end to two elements, in every period as an integer multiple of a period of each symbol of the received waves; and an arriving angle calculating section which calculates, in every period, an arriving angle as an inverse function of a difference in two phases which are proportional to a distance between the two elements, given as a function of positions of the elements and the arriving angle of the received waves, and contain a difference in phase shift amounts of the two receiving sections.

9 Claims, 8 Drawing Sheets

RADIO APPARATUS

CROSS-REFERENCE TO RELATED APPLICATION

This application is a continuation of international application PCT/JP03/02844 was filed on Mar. 11, 2003, the contents of which are herein wholly incorporated by reference.

BACKGROUND OF THE INVENTION

1. Field of the Invention

The present invention relates to a radio apparatus for estimating the direction from which a received wave arrives at an antenna and forming a radio transmission channel against a transmitting end of the received wave through the antenna.

2. Description of the Related Art

In recent years, many electronic units are provided with a digital signal processor that performs digital signal processes for many signals in the base band region at high speed, in real time, and at low cost have been outspread.

Thus, for example a radio base station of a mobile communication system that corresponds to the CDMA system actively uses such digital signal processes for not only keeping the directivity of each of a plurality of channels that are formed in parallel by an array antenna composed of a plurality of elements, but also removing interference caused by the directivity and improving the transmission quality of digital signals.

FIG. 8 is a block diagram showing an example of the structure of a radio base station's apparatus that has an array antenna. In the drawing, feeder ends of a plurality of N elements 90E-1 to 90E-N disposed at constant intervals on a virtual straight line are connected to their first input terminals of splitters 91-1 to 91-N, respectively. Output terminals of the splitters 91-1 to 91-N are connected to corresponding input terminals of an arriving angle estimating portion 93 and a beam forming portion 94-R through receiving portions 92-1 to 92-N, respectively. An output terminal of the beam forming portion 94-R is connected to an input terminal of a demodulating portion (not shown). An output terminal of the arriving angle estimating portion 93 is connected to a control input terminal of the beam forming portion 94-R and a control input terminal of a beam forming portion 94-T paired with the beam forming portion 94-R. An input terminal of the beam forming portion 94-T is connected to an output terminal of a modulating portion (not shown). A plurality of N output terminals of the beam forming portion 94-T are connected to first input terminals of signal combing portions 95-1 to 95-N. A single or a plurality of base band signals that will be described later are supplied in parallel to second to p-th (where p≧2) input terminals of each of the signal combining portions 95-1 to 95-N. Output terminals of the signal combining portions 95-1 to 95-N are connected to the other (second) input terminals of the splitters 91-1 to 91-N through transmitting portions 96-1 to 96-N, respectively.

Suffixes of the plurality of elements 90E-1 to 90E-N, splitters 91-1 to 91-N, and receiving portions 92-1 to 92-N are used in common throughout the following description. A combination of an element, a splitter, and a receiving portion that are cascade connected is referred to as a branch.

In the following description, a mutual arrangement of these branches is represented by a physical arrangement of the elements 90E-1 to 90E-N disposed on the foregoing virtual straight line.

In the apparatus of the radio base station, the receiving portions 92-1 to 92-N heterodyne detect (or homodyne detect) received waves that have arrived in parallel at the elements 90E-1 to 90E-N and then input through the splitters 91-1 to 91-N, respectively. As a result, the receiving portions 92-1 to 92-N generate N base band signals S1 to SN, respectively.

In this example, for simplicity, it is assumed that the amplitudes of the base band signals S1 to SN are a common value ("1" normalized by its nominal value). In addition, it is also assumed that the wavelengths of the received waves are a known value λ.

The arriving angle estimating portion 93 performs the following arithmetic operations expressed by the following formulas (1) to (4) to obtain the average value Θ of phase differences of the base band signals S1 to SN obtained through the branches adjacently disposed at constant intervals.

$$S_k = e^{j\theta_k} (k = 1 \text{ to } N) \quad (1)$$

$$\phi_{k,k+1} = Arg(S_{k+1} \cdot S_k^*) \quad (2)$$

$$\theta_{k,k+1} = \sin^{-1}(\phi_{k,k+1} \cdot \lambda / 2\pi d) \quad (3)$$

$$\Theta = \{1/(N-1)\} \cdot \sum_{k=1}^{N-1} \theta_{k,k+1} \quad (4)$$

In addition, the arriving angle estimating portion 93 obtains an arriving angle ΘA of the received waves as an azimuth angle that is uniquely defined by the average value Θ and the arrangement of the elements 90E-1 to 90E-N (including an azimuth represented by the foregoing virtual straight line).

The beam forming portion 94-R supplies to the demodulating portion a signal obtained as the sum of products of weights $e^{j\psi 1}$ to $e^{j\psi N}$ that represent phase shift amounts ψ1 to ψN against a main lobe of the array antenna 90 in the direction of the arriving angle ΘA and the base band signals S1 to Sn (the resultant signal is hereinafter referred to as base band signal R) so as to form a beam in the base band region.

On the other hand, the beam forming portion 94-T performs the reverse process of the process that the beam forming portion 94-R performs for the base band signal T supplied from the modulating portion. As a result, the beam forming portion 94-T generates N base band signals.

The signal combining portions 95-1 to 95-N combine these N base band signals and sets each of which is composed of a single or a plurality of base band signals, that correspond to the N branches, and that are modulated with transmission information to be transmitted to individual terminals (users) other than the transmitting end of the received wave is transmitted.

The transmitting portions 96-1 to 96-N convert N transmission base band signals into desired radio frequency signals and transmit them in parallel through the splitters 91-1 to 91-N and the elements 90E-1 to 90E-N, respectively.

In other words, since a full duplex radio transmission channel is formed against the transmitting end of the received wave that arrives at the array antenna 90 by the formed beam with a desired directivity, the transmission quality is kept high.

Patent Document 1

Japanese Unexamined Patent Application Publication No. 2002-107439

Patent Document 2

Japanese Unexamined Patent Application Publication No. HEI 10-170621

Patent Document 3

Japanese Unexamined Patent Application Publication No. HEI 6-273504

Patent Document 4

Japanese Unexamined Patent Application Publication No. HEI 8-114662

However, in the foregoing related art references, the accuracy of the arriving angle obtained by the arriving angle estimating portion 93 is sufficiently kept high when the deviations of the phase shift amounts and gains of the receiving portions 92-1 to 92-N are small.

However, the receiving portions 92-1 to 92-N have circuits and devices such as a low noise amplifier (LNA) and a frequency converter whose natural characteristics are nonlinear and involve deviations and whose phase shift amounts and gains may be subject to largely change corresponding to temperature, other environmental conditions, and aged deterioration of the apparatus.

In other words, the arriving angle obtained by the arriving angle estimating portion 93 involves an error and a change. The error and change may cause the transmission quality and the service quality to deteriorate.

These problems would be solved if the receiving portions were designed, produced, set, and kept so that the deviations of the characteristics are very small. Such countermeasures have not been taken because of high cost.

As a related art reference for solving the foregoing problems, there is a patent application filed by the applicant of the present patent application as Japanese Patent Application No. 2001-533594, titled Deviation Compensating Apparatus (translated title).

However, the deviation compensating apparatus needs to have as feed forward circuits dedicated branching circuits, combining circuits, receivers, and so forth. Thus, as the number of elements of an array antenna becomes larger, there is a possibility of which the scale of the hardware increases.

SUMMARY OF THE INVENTION

An object of the present invention is to provide a radio apparatus that allows transmission quality to be kept stable against a change of the environmental conditions and aged deterioration of the apparatus without needs to largely increase the scale of hardware regardless of the number of branches and deviations of characteristics of the branches.

In addition, an object of the present invention is to accurately and stably obtain the arriving angle of a received wave even if the phase shift amounts of individual receiving section vary due to a change of the environmental conditions and aged deterioration of the receiving section.

In addition, an object of the present invention is to shorten calculation time for the arriving angle, reducing power consumption, and keeping response characteristic high.

In addition, an object of the present invention is to suppress the deterioration of transmission quality.

In addition, an object of the present invention is to accurately obtain the arriving angle at low cost and perform various types of signal processing and beam forming corresponding to desired channel allocations, modulating systems, and multiple access systems.

In addition, an object of the present invention is to simplify wirings in a radio frequency portion and an intermediate frequency portion and standardize the structure.

In addition, an object of the present invention is to further improve transmission quality.

In addition, an object of the present invention is to improve the accuracy of the arriving angle of a received wave corresponding to its various structures such as a frame, a packet, and so forth.

In addition, an object of the present invention is to prevent transmission quality from lowering against insufficient accuracy of the arriving angle and to allow provided elements and receiving section to be effectively used to improve the transmission quality.

In addition, an object of the present invention is to improve the performance of an apparatus and a system to which the present invention is applied at low cost and to keep their general reliability high.

The foregoing object is accomplished by a radio apparatus that has two receiving sections for alternately detecting two received waves that have arrived from a same transmitting end to two elements, in every period as an integer multiple of a period of each symbol of the received waves and that calculates in every period an arriving angle as an inverse function of the difference in two phases proportional to the distance between the two elements, given as a function of the positions of the elements and the arriving angle of the received waves, and containing the difference in phase shift amounts of the two receiving sections.

In the radio apparatus, the difference does not contain phase shift amounts of the two receiving sections no matter how much these phase shift amounts are.

In addition, the foregoing object can be accomplished by the radio apparatus that decreases the difference in the phase shift amounts of the two receiving sections corresponding to the difference between one of the two phases and the value of the function of the arriving angle.

In the radio apparatus, since the deviations and changes in the phase shift amounts of the two receiving sections are decreased, an increase of the difference in the two phases can be suppressed corresponding to the deviations and changes in the phase shift amounts.

In addition, the foregoing object is accomplished by the radio apparatus that forms a main lobe of an antenna composed of a plurality of elements or containing these elements in the direction of the arriving angle.

In the radio apparatus, a radio transmission channel is formed with directivity in the direction represented with the arriving angle accurately obtained without dependence on the phase shift amounts of the two receiving sections and changes in the phase shift amounts.

In addition, the foregoing object can be accomplished by the radio apparatus whose the two receiving sections includes two detecting sections for detecting any received waves that have arrived at the two elements and a selecting section for alternately supplying in every period the received waves that have arrived at the two elements in parallel to the two detecting sections.

In the radio apparatus, the feeder points of the two elements are directly connected to corresponding inputs of the selecting section, not connected to both the receiving section. In addition, the receiving section is composed of two detecting sections and one selecting section.

In addition, the foregoing object can be accomplished by the radio apparatus that replaces signals of the received waves that have arrived in parallel at the two elements with two signals that are output as the detected results of the two receiving sections.

In the radio apparatus, although the received waves that arrive at the two elements in parallel are alternately detected by the two receiving sections at predetermined intervals, two branches regularly formed as a combination of the two elements and two receiving sections are maintained.

In addition, the foregoing object can be accomplished by the radio apparatus that decrease the deviations of levels of signals of the received waves that have arrived in parallel at the two elements.

In the radio apparatus, since the deviations of the characteristics of the receiving section are decreased with respect to the gains as well as the phase shift amounts, the accuracy of the arriving angle and the accuracy of the desired signal process for the received wave are improved.

In addition, the foregoing object can be accomplished by the radio apparatus wherein the period is a period for which a known slot or packet as the received wave arrives.

In the radio apparatus, the difference in two phases that represent the arriving angle of the received wave as the inverse function contains the difference in the phase shift amounts of the two receiving sections obtained as the average value of symbols that compose the slot or packet.

In addition, the foregoing object can be accomplished by the radio apparatus of which the number of elements (branches) is "3" or greater.

In the radio apparatus, even if the number N of elements is "3" or greater, the phase shift amounts of the two receiving sections are not contained in the difference no matter how much the phase shift amounts are.

In addition, the foregoing object can be accomplished by the radio apparatus of which arriving angles calculated by each pair of branches is averaged so as to improve the accuracy of the calculated result.

In the radio apparatus, the greater the number of pairs P is, the more the arriving angle becomes accurate.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

First of all, the theory of the radio apparatus according to the present invention will be described.

Figure 1:
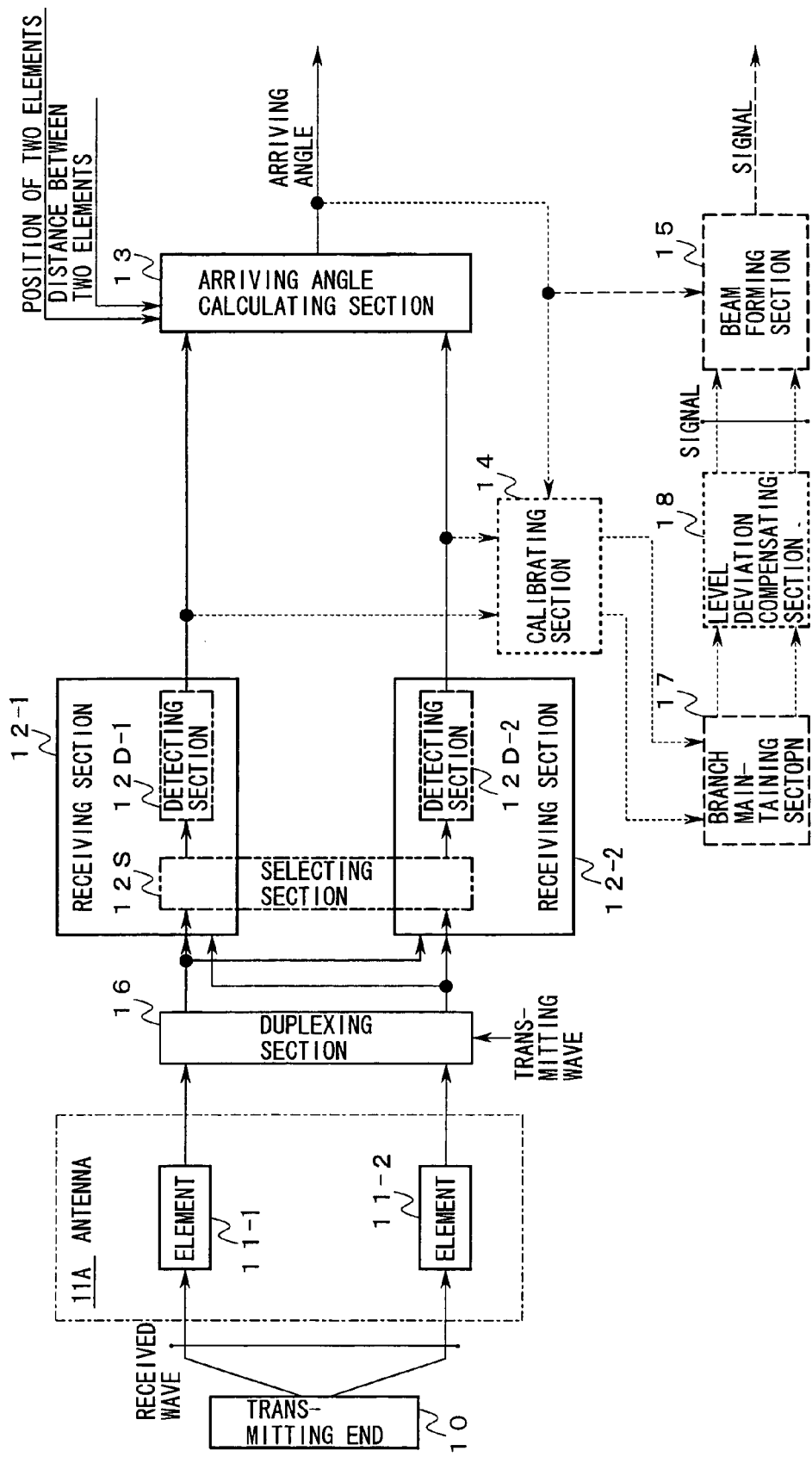
FIG. 1 is a first theoretical block diagram of the present invention.

FIG. 1 is a first theoretical block diagram of the present invention.

The radio apparatus of the present invention operates in accordance with the following first theory.

Two receiving sections 12-1 and 12-2 alternately detect received waves that have arrived at two elements 11-1 and 11-2 from a same transmitting end 10, in every period as an integer multiple of symbols of the received waves in parallel. An arriving angle calculating section 13 calculates in every period an arriving angle as the inverse function of the difference in two phases that are proportional to the distance between the two elements 11-1 and 11-2, that are given as functions of the positions thereof and the arriving angle of the received wave, and that contain the difference in the phase shift amounts of the two receiving sections 12-1 and 12-2.

The difference does not contain the phase shift amounts of the two receiving sections 12-1 and 12-2 no matter how much these phase shift amounts are.

Thus, even if the phase shift amounts of the receiving sections 12-1 and 12-2 vary because the environmental conditions change and the apparatus deteriorates over years, the arriving angle of the received wave can be accurately and stably obtained.

The radio apparatus of the present invention operates in accordance with the following second theory.

A calibrating section 14 decreases the difference in the phase shift amounts of the two receiving sections 12-1 and 12-2 corresponding to the difference between one of the two phases and the value of the function of the arriving angle obtained by the arriving angle calculating section 13.

In other words, since the deviations and changes in the phase shift amounts of the two receiving sections 12-1 and 12-2 are decreased, an increase of the difference in the two phases can be suppressed corresponding to the deviations and changes in the phase shift amounts.

Thus, the calculation time for the arriving angle is decreased. In addition, the power consumption is decreased. The response characteristic and other performances are improved.

The radio apparatus of the present invention operates in accordance with the following third theory.

A beam forming section 15 forms a main lobe of an antenna 11A composed of a plurality of elements or containing these elements in the direction of the arriving angle.

In other words, a radio transmission channel having directivity is formed with directivity in the direction represented with the arriving angle accurately obtained without dependence on the phase shift amounts of the two receiving sections 12-1 and 12-2 and changes in these phase shift amounts.

Thus, in the radio transmission path, deterioration of transmission quality is suppressed with the directivity.

The radio apparatus of the present invention operates in accordance with the following fourth theory.

Two receiving sections 12-1 and 12-2 are composed of two detecting sections 12D-1 and 12D-2 and a selecting section 12S. The selecting section 12S alternately supplies in every period received waves that have arrived at two elements 11-1 and 11-2 in parallel to the two detecting sections 12D-1 and 12D-2. These detecting sections 12D-1 and 12D-2 detect the received waves in parallel.

In other words, feeder terminals of the two elements 11-1 and 11-2 are directly connected to corresponding inputs of the selecting section 12S, not connected to the two receiving sections 12-1 and 12-2. The receiving sections 12-1 and 12-2 are composed of two detecting sections 12D-1 and 12D-2 and a selecting section 12S.

Thus, the wirings of the radio frequency portion or the intermediate frequency portion are simplified. In addition, the structure is standardized.

The radio apparatus of the present invention operates in accordance with the following fifth theory.

A fifth theory of the radio apparatus according to the present invention is as follows.

A branch maintaining section 17 replaces signals of the received waves that have arrived in parallel at the two elements 11-1 and 11-2 with two signals that are output as detected results of the two receiving sections 12-1 and 12-2.

In other words, although the received waves that arrive at the two elements 11-1 and 11-2 in parallel are alternately detected by the two receiving sections 12-1 and 12-2 at predetermined intervals, two branches regularly formed as a combination of the two elements 11-1 and 11-2 and the two receiving sections 12-1 and 12-2 are maintained.

Thus, the arriving angle can be accurately obtained at low cost. In addition, various types of signal processing and beam forming corresponding to desired channel allocations, modulating systems, and multiple access systems can be flexibly accomplished.

The radio apparatus of the present invention operates in accordance with the following sixth theory.

A level deviation compensating section 18 decreases the deviations of levels of signals of the received waves that have arrived in parallel at the two elements 11-1 and 11-2.

In other words, since the deviations of the characteristics of the receiving sections 12-1 and 12-2 are decreased with respect to gains as well as phase shift amounts, the accuracy of the arriving angle and the accuracy of the desired signal process for the received wave are improved.

Thus, the deterioration of the transmission quality is suppressed.

The radio apparatus of the present invention operates in accordance with the following seventh theory.

The foregoing period is a period for which a known slot or packet as the received wave arrives.

In other words, the difference in two phases that represent the arriving angle of the received wave as the inverse function contains the difference in the phase shift amounts of the two receiving sections obtained as the average value of symbols that compose the slot or packet.

Thus, since the present invention is flexibly applied to various structures such as frames and packets, the accuracy of the arriving angle is improved.

Figure 2:
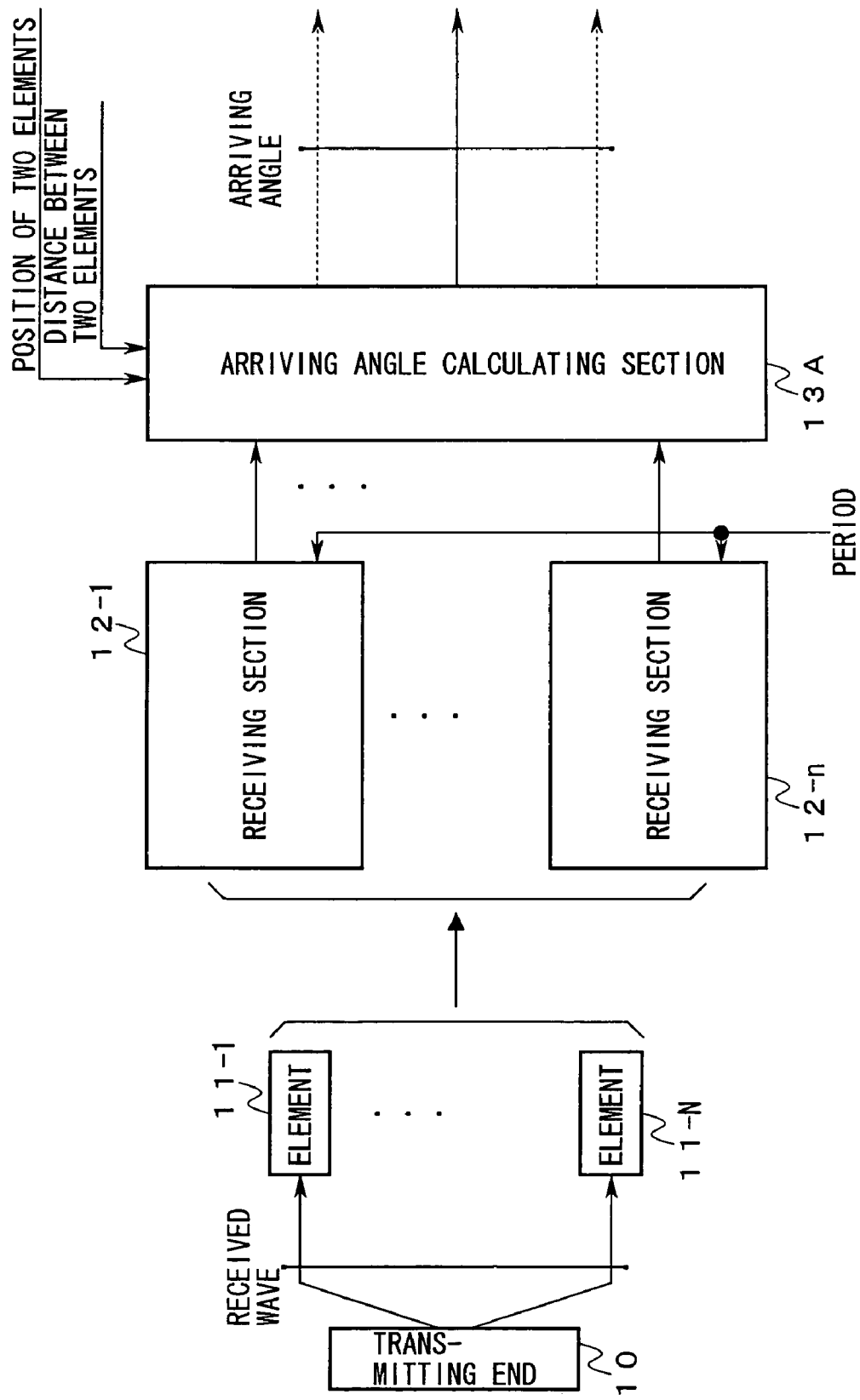
FIG. 2 is a second theoretical block diagram of the present invention.

FIG. 2 is a second theoretical block diagram of the present invention.

The radio apparatus of the present invention operates in accordance with the following eighth theory.

A plurality of n ($\leqq 2P$) receiving sections 12-1 to 12-n alternately detect two received waves whenever a period of an integer multiple of two received waves that have received in parallel from the transmitting end 10 to two elements elapses every logical pair or a plurality N of elements 11-1 to 11-N or every P logical pairs thereof.

An arriving angle calculating section 13A calculates an arriving angle as an inverse function of the difference in two phases proportional to the distance between the two elements, given as a function of the positions of the elements and the arriving angle of the received waves, and containing the difference in phase shift amounts of two receiving sections for alternately detecting the received waves in parallel every logical pair or every P logical pairs whenever the period elapses.

In other words, even if the number N of elements 11-1 to 11-N is "3" or greater, the phase shift amounts of the two receiving sections of each pair are not contained in difference no matter how much the phase shift amounts are.

Thus, even if the phase shift amounts of the receiving sections 12-1 to 12-n vary because the environmental conditions change and the apparatus deteriorates over years, the arriving angles of the received waves can be accurately and stably obtained.

The radio apparatus of the present invention operates in accordance with the following ninth theory.

The arriving angle calculating section 13A identifies the arriving angle as the average value of the arriving angles calculated every logical pair or every P logical pairs.

In other words, the greater the number P of pairs is, the more the arriving angle becomes accurate.

Thus, the deterioration of the transmission quality due to insufficient accuracy of the arriving angle can be suppressed. In addition, the elements 11-1 to 11-N and the receiving sections 12-1 to 12-n can be effectively used.

Next, with reference to the accompanying drawings, embodiments of the present invention will be described.

First Embodiment

Figure 3:
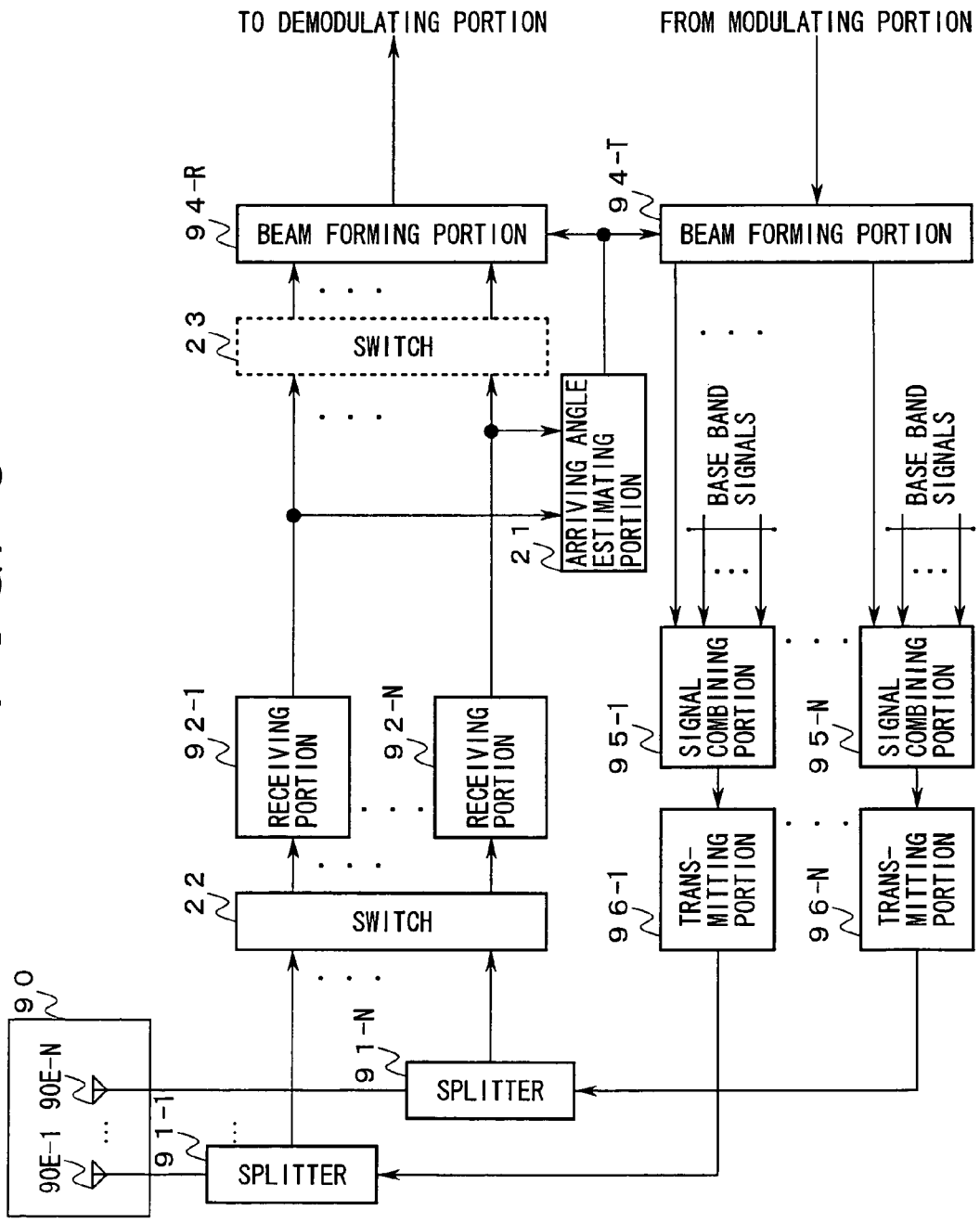
FIG. 3 is a schematic diagram showing a first embodiment and a third embodiment of the present invention.

FIG. 3 is a schematic diagram showing a first embodiment and a third embodiment of the present invention.

Figure 8:
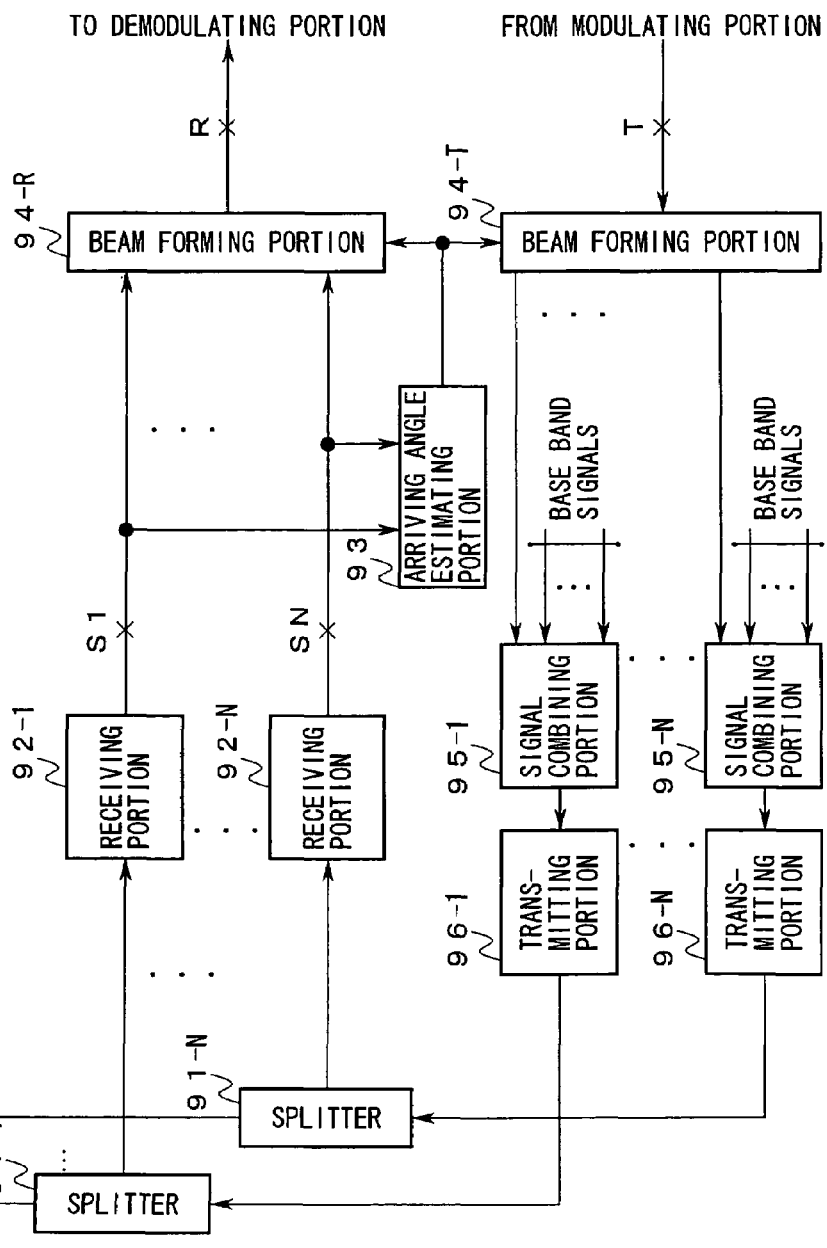
FIG. 8 is a schematic diagram showing an example of the structure of an apparatus of a radio base station, the apparatus having an array antenna.

This embodiment has an arriving angle estimating portion 21 instead of the arriving angle estimating portion 93 shown in FIG. 8. In addition, a switch 22 is disposed between a stage of splitters 91-1 to 91-N and a stage of receiving portions 92-1 to 92-N.

Figure 4:
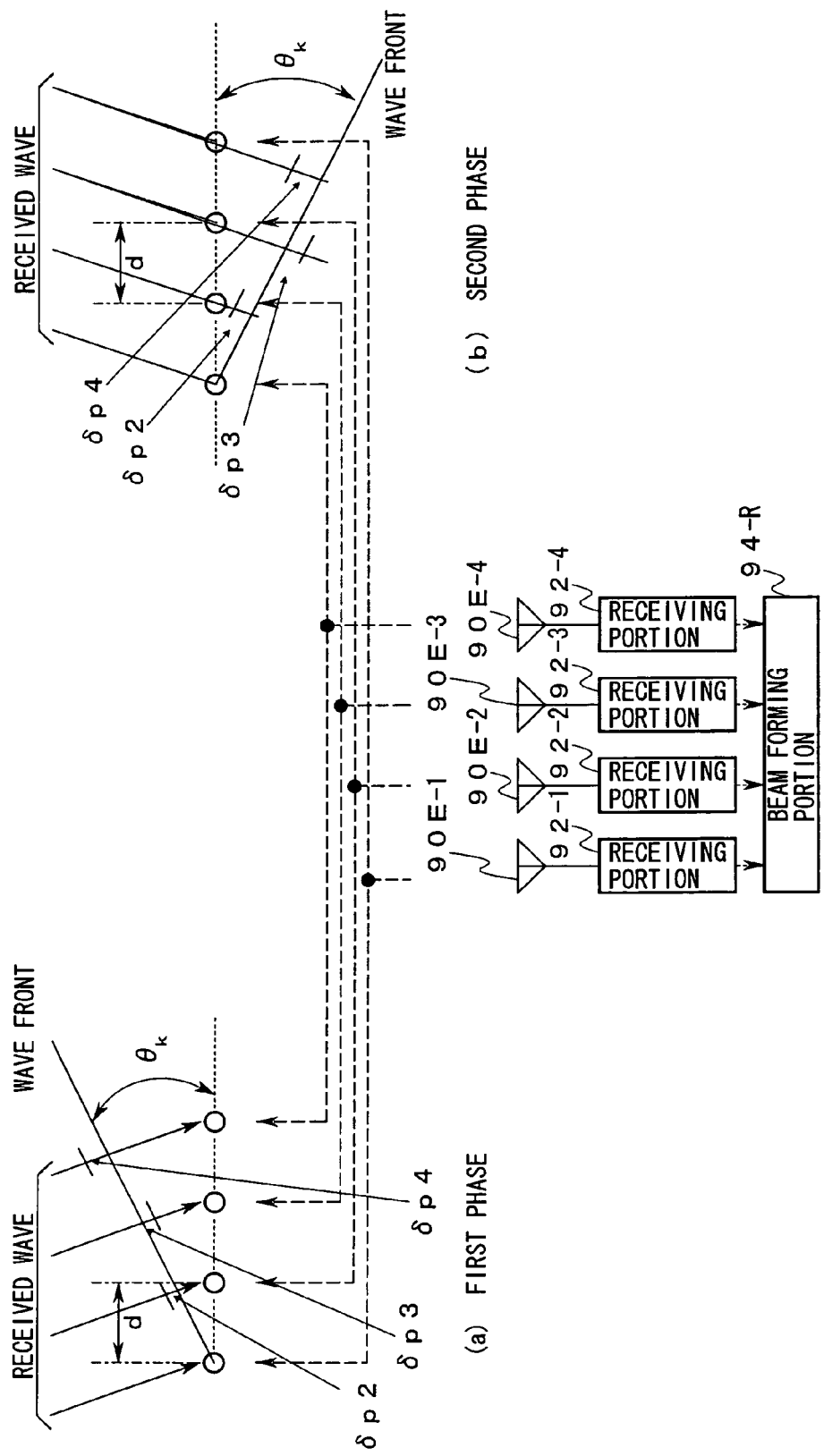
FIG. 4 is a schematic diagram describing the operation of the first embodiment of the present invention.

FIG. 4 is a schematic diagram describing the operation of the first embodiment of the present invention.

Next, with reference to FIG. 3 and FIG. 4, the operation of the first embodiment of the present invention will be described.

In this embodiment, the arriving angle estimating portion 21 and the switch 22 cooperatively perform the following process.

The switch 22 alternately connects outputs of the splitters 91-1 to 91-N to inputs of the receiving portions 92-1 to 92-N at intervals of and in synchronization with symbols of a received wave that arrives at an array antenna 90 in the following manners (a) and (b).

(a) The output of the splitter 91-i is connected to the input of the receiving portion 92-i (where i=1 to N).
(b) The output of the splitter 91-(N−i+1) is connected to the input of the receiving portion 92-i (where i=1 to N).

In the following description, the period for which the outputs of the splitters 91-1 to 91-N and the inputs of the receiving portions 92-1 to 92-N are connected in the manner (a) is referred to as the first phase. In contrast, the period for which they are connected in the manner (b) is referred to as the second phase.

Thus, when distance d of adjacent two of the elements 90E-1 to 90E-N adjacently disposed on a virtual straight line and wave length $\lambda$ of the received wave are given as known values and arriving angle $\theta_k$ that represents the direction in which the received wave arrives is defined as an unknown value along with differences $\sigma p2$ to $\sigma pN$ between phase shift amounts of the receiving portions 92-2 to 92-N and the phase shift amount of the receiving portion 92-1, in the first phase, the phases of the base band signals as the outputs of the receiving portions 92-2 to 92-N are represented by relative values $\delta\theta_2$ to $\delta\theta_N$ (hereinafter referred to as phase differences) given by the following formulas (f2) to (fN) against the phase of the base band signal of the output of the receiving portion 92-1 (hereinafter, this phase is referred to as reference phase 1).

$$\delta\theta_2 = 2\pi d/\lambda \cdot \sin\theta_k + \delta p2 \qquad \text{(f2)}$$

...

...

...

$$\delta\theta_N = 2\pi(N-1)d/\lambda \cdot \sin\theta_k + \delta pN \qquad \text{(fN)}$$

Compared with the first phase, in the second phase, although branches contain the receiving portions 92-1 to 92-N, pairs of the elements (denoted by 90E-1 to 90E-N) connected to the receiving portions 92-1 to 92-N and the splitters (denoted by 91-1 to 91-N) are changed. Thus, the sign of the arriving angle at which the received wave arrives is inverted as shown in FIG. 4(*a*) and FIG. 4(*b*).

Thus, in the second phase, the phases of the base band signals obtained as the outputs of the receiving portions 92-2 to 92-N are represented by relative values $\delta\theta_2'$ to $\delta\theta_N'$ (hereinafter referred to as phase differences) given by the following formulas (f2') to (fN') against the phase of the base band signal of the output of the receiving portion 92-1 (hereinafter, this phase is referred to as reference phase 2).

$$\delta\theta_2' = 2\pi d/\lambda \cdot \sin(-\theta_k) + \delta p2 \qquad \text{(f2')}$$

...

...

...

$$\delta\theta_N' = 2\pi(N-1)d/\lambda \cdot \sin(-\theta_k) + \delta pN \qquad \text{(fN')}$$

In the second phase, by deleting the differences $\delta p2$ to $\delta pN$ from the formulas (f2) to (fN) and (f2') to (fN'), these formulas can be rephrased as the following formulas (F2) to (FN) with respect to the arriving angle $\theta_k$ independently from any phase shift amounts of the receiving portions 92-1 to 92-N.

$$\theta_k = \sin^{-1}[(\delta\theta_2 - \delta\theta_2')\lambda/4\pi d] \qquad \text{(F2)}$$

...

...

...

$$\theta_k = \sin^{-1}[(\delta\theta_N - \delta\theta_N')\lambda/4(N-1)\pi d] \qquad \text{(FN)}$$

The arriving angle estimating portion 21 obtains the phase differences $\delta\theta_2$ to $\delta\theta_N$ and $\delta\theta_2'$ to $\delta\theta_N'$ in the first phase and the second phase in synchronization with the switch 22 and substitutes these phase differences $\delta\theta_2$ to $\delta\theta_N$ and $\delta\theta_2'$ to $\delta\theta_N'$ into the formulas (F2) to (FN). Thereafter, the arriving angle estimating portion 21 averages the (N−1) arriving angles $\theta_k$. As a result, the arriving angle estimating portion 21 can accurately obtain the arriving angle $\theta_k$ of the received wave.

Since the switch 22 is disposed on the upstream stage of the receiving portions 92-1 to 92-N and the arriving angle estimating portion 21 and the switch 22 cooperatively perform the forgoing process, the arriving angle $\theta_k$ can be obtained as expressed by the formulas (F2) to (FN) independently from any phase shift amounts of the receiving portions 92-1 to 92-N.

In other words, even if the phase shift amounts of the receiving portions 92-1 to 92-N vary because the environmental conditions change and the apparatus deteriorates over years, the arriving angle of the desired wave can be accurately and stably obtained without need to largely change the conventional structure.

In addition, a beam forming portion 94-T forms a main lobe of the array antenna 90 in the direction of the arriving angle obtained in such a manner.

Thus, according to this embodiment, a radio transmission channel having good transmission quality can be stably formed without tradeoffs of power consumption and general reliability. As a result, the service quality is highly kept.

In addition, according to this embodiment, in a radio base station of a mobile communication system, a full duplex radio communication channel having directivity is formed with a terminal through an array antenna.

However, the present invention is not limited to such a radio base station. In other words, the present invention can be applied to a measuring system and a monitoring system that obtain the direction in which a received wave arrives and monitor the received wave, respectively.

In addition, according to this embodiment, in the first phase and the second phase, a received wave that is alternatively input to the receiving portions 92-1 to 92-N by the switch 22.

However, the present invention is not limited to such a structure. Instead, the switch 22 may be disposed at each of the receiving portions 92-1 to 92-N. The receiving portions 92-1 to 92-N may select a received wave to be obtained.

In addition, the formulas (f2) to (fN) and (f2') to (fN') may be replaced with equivalent approximate expressions or any other expressions as long as other variable (unknowns) are not added to those formulas.

Second Embodiment

Figure 5:
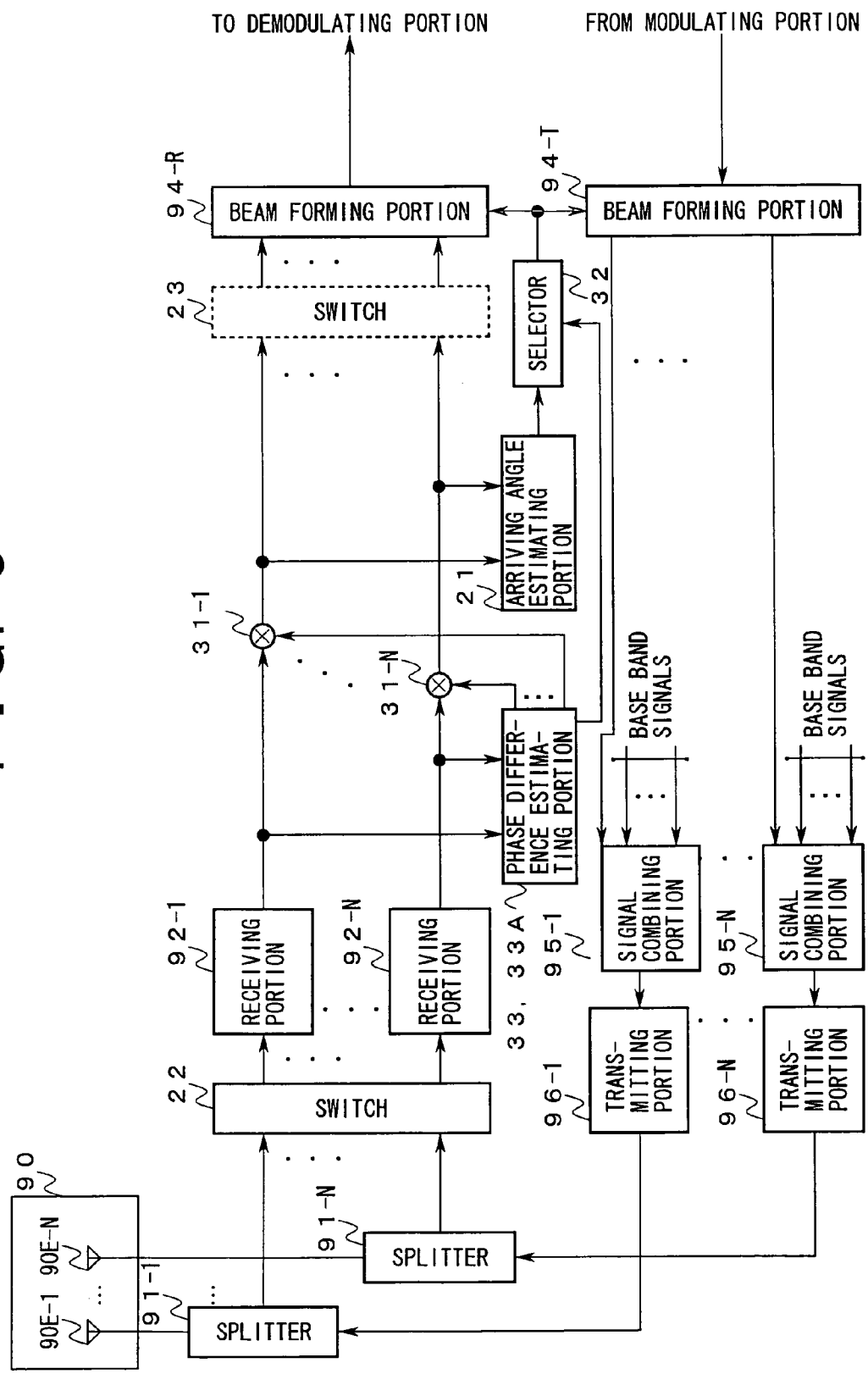
FIG. 5 is a schematic diagram showing a second embodiment and a fifth embodiment of the present invention.

FIG. 5 shows second and fifth embodiments of the present invention.

As shown in FIG. 5, according to this embodiment, the following portions are added.

Multiplying devices 31-1 to 31-N disposed on a downstream stage of the receiving portions 92-1 to 92-N and first inputs of the multiplying devices 31-1 to 31-N are connected to the outputs of the receiving portions 92-1 to 92-N, respectively.

A selector 32 whose first input is connected to the output of the arriving angle estimating portion 21 and whose output is connected to control inputs of beam forming portions 94-R and 94-T.

A phase difference estimating portion 33 having N inputs connected to the first input terminals of the multiplying devices 31-1 to 31-N and the outputs of the receiving portions 92-1 to 92-N, a first output connected to the other input of the selector 32, and second to (N+1)th outputs connected to the other inputs of the multiplying devices 31-1 to 31-N.

Next, with reference to FIG. 5, the operation of the second embodiment will be described.

In this embodiment, the phase difference estimating portion 33 performs the following process. In addition, the multiplying portions 31-1 to 31-N and the selector 32 operate in cooperation with the phase difference estimating portion 33.

When the apparatus gets started, the phase difference estimating portion 33 sets initial value "1" to all the multiplying devices 31-1 to 31-N.

At predetermined periods or intervals, the selector 32 connects the first output of the arriving angle estimating portion 21 to the control inputs of the beam forming portions 94-R and 94-T.

Thus, in this state, as with the first embodiment, the arriving angle estimating portion 21 and the beam forming portions 94-R and 94-T cooperatively operate.

At the predetermined periods or intervals, (hereinafter referred to as calibration periods), the phase difference estimating portion 33 performs the following process:

obtain the arriving angle $\theta_k$ in the same process as the arriving angle estimating portion 21 of the first embodiment does, obtain the differences $\delta p2$ to $\delta pN$ between the N phase shift amounts of the receiving portions 92-2 to 92-N and the phase shift amount of the receiving portion 92-1 (hereinafter referred to as the reference receiving portion) as roots of simultaneous equations of which the arriving angle $\theta_k$ is substituted into a pair of the formulas (f2) and (f2') and a pair of the formulas (fN) and (fN'), give the weights that decrease the differences $\delta p2$ to $\delta pN$ to the multiplying devices 31-1 to 31-N, and give the obtained arriving angle $\theta_k$ instead of the arriving angle $\theta_k$ obtained by the arriving angle estimating portion 21 to the beam forming portions 94-R and 94-T through the selector 32.

In other words, the phase difference estimating portion 33 and the multiplying devices 31-1 to 31-N cooperatively cause the deviations and changes in the phase shift amounts of the receiving portions 92-1 to 92-N to become the minimum values.

Thus, according to this embodiment, the range of values referenced in calculations performed by the arriving angle estimating portion 21 is kept smaller than the case that the deviations and changes in phase change amounts are not decreased. Thus, the calculation time is decreased. In addition, the power consumption is decreased. The response characteristic and other performances are improved. In addition, the total reliability is kept high.

According to this embodiment, at each calibration period, the phase difference estimating portion obtains new weights. The arriving angle estimating portion 21 supplies the arriving angle $\theta_k$ to the beam forming portions 94-R and 94-T in accordance with the weights assigned to the multiplying devices 31-1 to 31-N.

However, the present invention is not limited to such a structure. For example, after the apparatus gets started, if it is permitted to have a regular response delay, the phase difference estimating portion 33 can have the function of the arriving angle estimating portion 21 without need to dispose it along with the selector 32.

In addition, according to this embodiment, after the phase difference estimating portion 33 and the multiplying devices 31-1 to 31-N have compensated the differences of the phase shift amounts of the receiving portions 92-1 to 92-N, the phase difference estimating portion 33 stops. Instead of the phase difference estimating portion 33, the arriving angle estimating portion 21 obtains the arriving angle $\theta_k$.

However, the present invention is not limited to such a structure. After the differences of the phase shift amounts have been compensated, instead of the arriving angle estimating portion 21, for example the phase difference estimating portion 33 may obtain the arriving angle $\theta_k$.

In addition, the arriving angle estimating portion 21 that obtains the arriving angle $\theta_k$ instead of the phase difference estimating portion 33 may be replaced with a conventional arriving angle estimating portion that does not correspond to the present invention. Thus, the hardware scale and power consumption can be decreased. In addition, the total reliability can be improved.

In addition, according to this embodiment, the phase difference estimating portion 33 assigns a new weight to the multiplying devices 31-1 to 31-N without synchronization with the received wave.

However, the present invention is not limited to such a structure. A new weight may be assigned to the multiplying devices 31-1 to 31-N in synchronization with a received wave, any transmission unit thereof such as frame or slot, or any symbol.

Third Embodiment

Next, a third embodiment of the present invention will be described.

According to this embodiment, as shown in FIG. 3, a switch 23 is disposed on an upstream stage of the beam forming portion 94-R.

Next, with reference to FIG. 3, the operation of the third embodiment of the present invention will be described.

In this embodiment, the switch 23 performs the following operation.

Like the first embodiment, in the first phase, the switch 23 connects the outputs of the receiving portions 92-1 to 92-N to the first to N-th inputs of the beam forming portion 94-R, respectively.

In the second phase, the switch 23 connects the outputs of the receiving portions 92-N, 92-(N−1), ..., and 92-1 to the first to N-th inputs of the beam forming portion 94-R, respectively.

In other words, obtained from the first to N-th outputs of the switch 23 are base band signals corresponding to only received waves that have successively arrived at the elements 90E-1 to 90E-N no matter what phase, namely the first phase or second phase (no matter how the receiving portions 92-1 to 92-N and the splitters 91-1 to 91-N are connected through the switch 22).

Thus, according to this embodiment, various types of signal processing and beam forming can be flexibly performed in a base band region corresponding to desired channel allocations, modulating systems, and multiple access systems.

Fourth Embodiment

Figure 6:
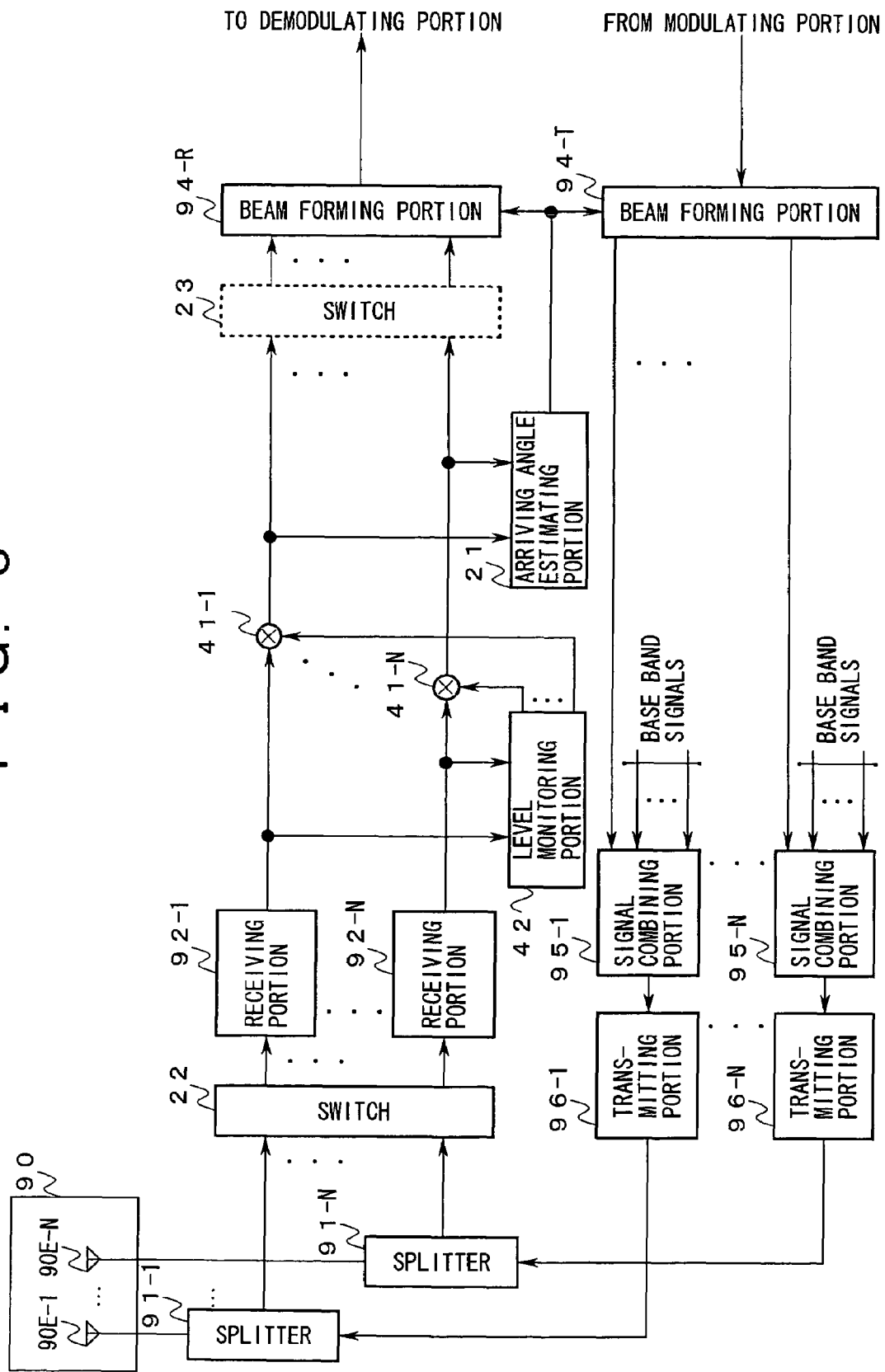
FIG. 6 is a schematic diagram showing a fourth embodiment of the present invention.

FIG. 6 is a block diagram showing a fourth embodiment of the present invention.

As shown in FIG. 6, according to this embodiment, the following portions are added.

Multiplying devices 41-1 to 41-N disposed on an upstream stage of the arriving angle estimating portion 21 and the switch 23. First inputs of the multiplying devices 41-1 to 41-N are connected to the outputs of the receiving portions 92-1 to 92-N.

A level monitoring portion 42 cascade connected to the outputs of the receiving portions 92-1 to 92-N. Outputs of the level monitoring portion 42 are connected to the second input terminals of the multiplying devices 41-1 to 41-N.

Next, with reference to FIG. 6, the operation of the fourth embodiment will be described.

In this embodiment, the level monitoring portion 42 and the multiplying portions 41-1 to 41-N cooperatively perform the following operation.

The level monitoring portion 42 repeats the following process at predetermined periods (frequency).

Integrate each of N base band signals that are output from the receiving portions 92-1 to 92-N in parallel so as to obtain the average value (level) of the amplitudes of each of the base band signals.

Obtain a weight as a scalar amount that allows the differences of these average values (levels) to become small and assign the weight to the multiplying devices 41-1 to 41-N.

The multiplying devices 41-1 to 41-N multiply by the weight the base band signals that are output from the receiving portions 92-1 to 92-N in parallel so as to decrease the differences of the amplitudes (levels) of the base band signals.

In other words, since the deviations of the phase shift amounts and gains as characteristics of the receiving portions 92-1 to 92-N are decreased, the accuracy of the signal process performed for received waves in the base band region is improved in addition to that of the arriving angle $\theta_k$. As a result, the transmission quality is kept high.

Fifth Embodiment

Next, a fifth embodiment of the present invention will be described.

As shown in FIG. 5, according to this embodiment, a phase difference estimating portion 33A is disposed instead of the phase difference estimating portion 33.

Next, with reference to FIG. 5, the operation of the fifth embodiment of the present invention will be described.

In this embodiment, the phase difference estimating portion 33A performs the following operation.

The phase difference estimating portion 33A selects from the receiving portions 92-1 to 92-N one that satisfies the following conditions as a reference receiving portion (in this example, for simplicity, it is assumed that the receiving portion 92-1 is selected for the reference receiving portion).

A receiving portion of which the change width of the phase shift amount that has been logically obtained or measured is the minimum A receiving portion of which the phase shift amount (that may be measured at a predetermined frequency) is known.

A receiving portion of which both the phase shift amount and its width or either thereof is the minimum.

In addition, the phase difference estimating portion 33A repeats the following processes (1) and (2) at predetermined periods (frequency).

(1) By performing the same process as the second embodiment, the phase difference estimating portion 33A obtains the differences δp2 to δpN between the phase shift amounts of the non-reference receiving portions (for example, the receiving portions 92-2 to 92-N) and the phase shift amount of the reference receiving portion and monitors the widths of the differences δp2 to δpN.

(2) The phase difference estimating portion 33A identifies a receiving portion whose width of difference is the smallest (one of δp2 to δpN) as a new reference receiving portion.

In other words, the phase shift amounts of the receiving portions 92-1 to 92-N are evaluated as relative values against a phase shift amount whose change is the smallest in the receiving portions 92-1 to 92-N. The evaluated phase shift amounts are used to estimate the arriving angle $\theta_k$. In addition, they are used to decrease the differences of the phase shift amounts.

Thus, in comparison with the case that the phase shift amount of the reference receiving portion widely varies, the range of the calculation objects becomes narrow. In addition to a decrease of significant digits of the calculations, the truncation error and termination error can be decreased.

In the foregoing embodiments, the first phase and the second phase are alternately switched every symbol of a received wave.

Alternatively, this switching may be performed every any transmission unit such as a slot or a packet that arrives as a received wave.

In addition, in the foregoing embodiments, the number N of elements 90E-1 to 90E-N is not designated.

However, the number N of elements can be increased as long as the process amount can be increased in accordance with the increase of the number N of elements.

In addition, in the foregoing embodiments, the splitters 91-1 to 91-N (elements 90E-1 to 90E-N) are connected to the input terminals of the receiving portions 92-1 to 92-N in pairs in one of two connecting arrangements of the splitters 91-1 to 91-N depending on the first phase or the second phase, in each of the two connecting arrangements, the elements having constant intervals and being connected to the receiving portions 92-1 to 92-N in the one-to-one relation, but shifted by one position each.

However, the present invention is not limited to such a structure. As long as the characteristics of the splitters 91-1 to 91-N (elements 90E-1 to 90E-N) are considered to be equal, the intervals of elements that alternately supply received waves to the paired receiving portions 92-1 to 92-N may not be always assigned in the descending order or ascending order, but a common value.

In addition, elements in one connecting arrangement may be contained in elements in the other connecting arrangement.

In addition, in the foregoing embodiments, the arriving angle $\theta_k$ is obtained as the average value of (N−1) arriving angles of (N−1) receiving portions of the receiving portions 92-1 to 92-N other than the reference receiving portion.

However, when the first embodiment is applied to only two receiving portions, the arriving angle $\theta_k$ can be obtained, the arriving angle $\theta_k$ can be obtained without need to perform any integrating process. Alternatively, the arriving angle $\theta_K$ may be obtained by chronologically smoothening (integrating) arriving angles.

In addition, these two elements may not compose an array antenna. Alternatively, these two elements may be part of elements that compose the array antenna.

In addition, in the foregoing embodiments, the present invention is applied to a radio base station of a mobile communication system, the radio base station having an array antenna.

However, the present invention is not limited to such a mobile communication system. As long as the apparatus forms a radio transmission channel through an antenna (may not be an array antenna) composed of a plurality of elements that receive waves in parallel, the present invention can be applied no matter what channel allocation, multiple access system, frequency allocation, zone structure, modulating system, and structure of transmission information are used.

In addition, in the foregoing embodiments, the array antenna 90 is composed of elements 90E-1 to 90E-N disposed at constant intervals along a virtual straight line.

However, the array antenna 90 is not limited to such a structure. As long as the arriving angle $\theta_k$ of the received wave is uniquely defined with a known function (logical equation, approximate expression, experimental expression, or the like), the arrangement of the elements 90E-1 to 90E-N is not restricted with respect to the following items.

Intervals of elements 90E-1 to 90E-N

Figure 7:
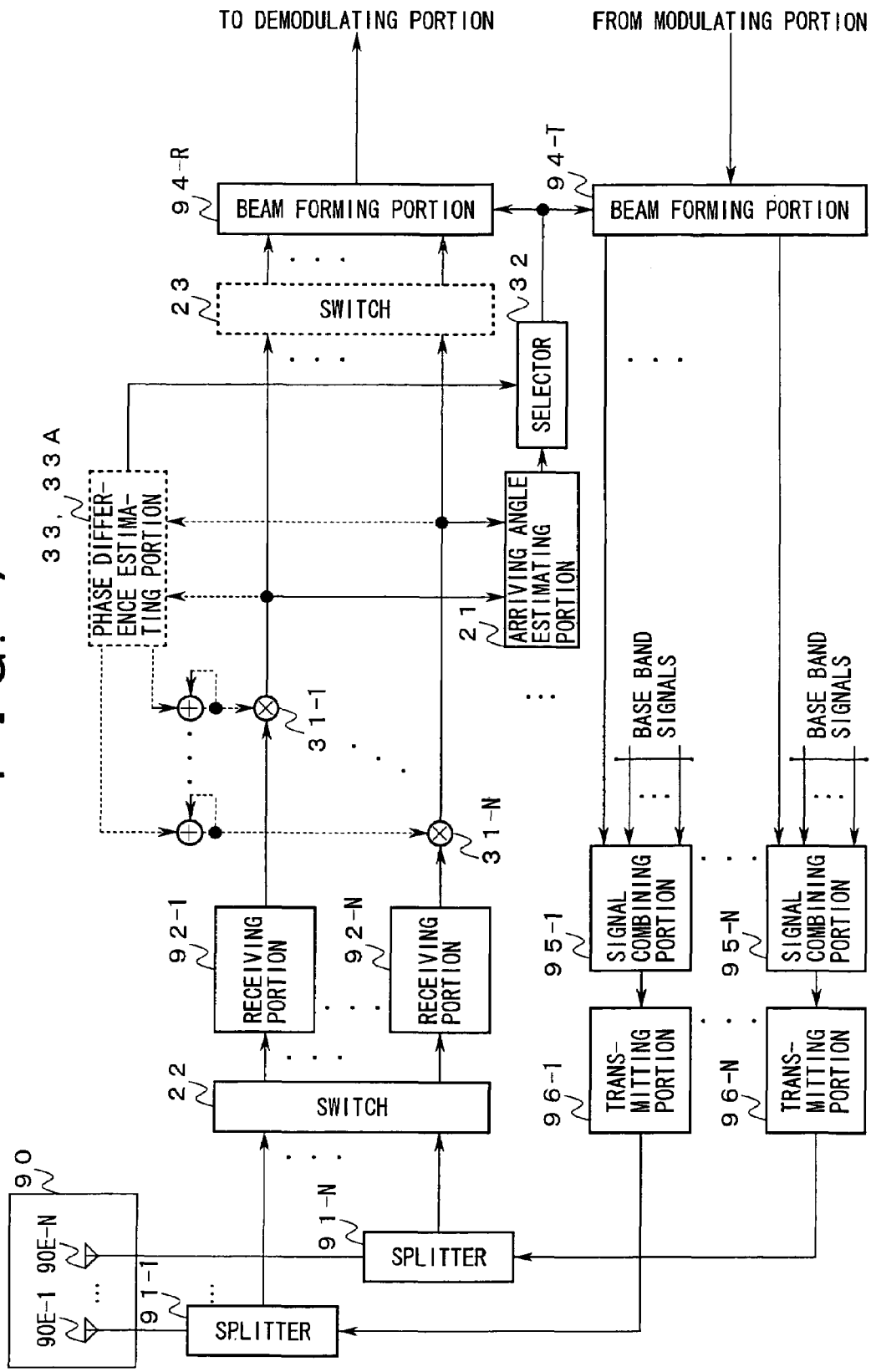
FIG. 7 is a schematic diagram showing another structure of the second embodiment and the fifth embodiment of the present invention.

Phase differences of waves received by the receiving portions 92-1 to 92-N in the first phase and the second phase Differences of phase shift amounts of the receiving portions 92-1 to 92-N In addition, according to the second to fifth embodiments, as denoted by dotted lines shown in FIG. 7, processes that the phase difference estimating portions 33 and 33A and the multiplying devices 31-1 to 31-N perform may be performed in the reverse chronological order.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

In the radio apparatus according to the first and eighth aspects of the present invention, even if the phase shift amounts of the receiving sections vary because the environmental conditions change and the apparatus deteriorates over years, the arriving angle of the received wave can be accurately and stably obtained.

In the radio apparatus according to the second aspect of the present invention, the calculation time for the arriving angle is decreased. In addition, the power consumption is decreased. The response characteristic is highly kept.

In the radio apparatus according to the third aspect of the present invention, the deterioration of the transmission quality is suppressed.

In the radio apparatus according to the fourth aspect of the present invention, the wirings of the radio frequency portion or the intermediate frequency portion are simplified. In addition, the structure is standardized.

In the radio apparatus according to the fifth aspect of the present invention, the arriving angle can be accurately obtained at low cost. In addition, various types of signal processing and beam forming corresponding to desired channel allocations, modulating systems, and multiple access systems can be flexibly accomplished.

In the radio apparatus according to the sixth aspect of the present invention, the transmission quality is further improved.

In the radio apparatus according to the seventh aspect of the present invention, since it is flexibly applied to various structures such as frames and packets, the accuracy of the arriving angle is improved.

In the radio apparatus according to the ninth aspect of the present invention, the deterioration of the transmission quality due to insufficient accurate arriving angle can be suppressed. In addition, the elements and the receiving sections can be effectively used.

Thus, the apparatus and system according to the present invention are able to improve their performance thereof at low cost as well as to maintain high total reliability.

The invention is not limited to the above embodiments and various modifications may be made without departing from the spirit and scope of the invention. Any improvement may be made in part or all of the components.

What is claimed is:

1. A radio apparatus, comprising:
   two receiving sections alternately detecting two received waves in every period which is an integer multiple of a period of each symbol of the two received waves, the two received waves having arrived from a same transmitting end to two elements; and
   an arriving angle calculating section calculating, in every period, an arriving angle as an inverse function of a difference in two phases which are proportional to a distance between the two elements, given as a function of positions of the two elements and an arriving angle of the two received waves, and contain a difference in phase shift amounts of the two receiving sections in common.

2. The radio apparatus as set forth in claim 1, further comprising:
   a calibrating section decreasing the difference in the phase shift amounts of the two receiving sections corresponding to the difference between one of the two phases and the value of the function of the arriving angle obtained by the arriving angle calculating section.

3. The radio apparatus as set forth in claim 1, further comprising:
   a beam forming section forming a main lobe of an antenna composed of the two elements or containing the two elements in a direction of the arriving angle obtained by the arriving angle calculating section.

4. The radio apparatus as set forth in claim 1, wherein the two receiving sections includes: two detecting sections detecting any received waves that have arrived at the two elements; and a selecting section alternately supplying in every period the received waves that have arrived at the two elements in parallel to the two detecting sections.

5. The radio apparatus as set forth in claim 1, further comprising:
   a branch maintaining section replacing signals of the received waves that have arrived in parallel at the two elements with two signals that are output as detection results by the two receiving sections.

6. The radio apparatus as set forth in claim 5, further comprising:
   a level deviation compensating section decreasing deviations in levels of signals of the received waves that have arrived in parallel at the two elements.

7. The radio apparatus as set forth in claim 1, wherein the period is a period for which a known slot or packet arrives as the received wave.

8. A radio apparatus, comprising:
   n ($\leq 2P$) receiving section alternatively detecting two received waves for a pair or every P pairs of elements every time a period elapses, the pair being composed by dividing a plurality N of elements in two logically, the period being an integer multiple of a period of a symbol of two received waves that have arrived in parallel from a same transmitting end to two elements; and
   an arriving angle calculating section calculating an arriving angle for the pair or every P pairs as an inverse function of a difference in two phases every time the period elapses, the two phases being proportional to a distance between the two elements, given as a function of positions of the elements and the arriving angle of the received waves, and contain a difference in phase shift amounts of two receiving sections which alternately detects the received waves.

9. The radio apparatus as set forth in claim 8, wherein the arriving angle calculating section identifies the arriving angle as an average value of arriving angles calculated for the pair or every P pairs.

* * * * *